US006963557B2

(12) United States Patent
Knox

(10) Patent No.: US 6,963,557 B2
(45) Date of Patent: Nov. 8, 2005

(54) SYSTEM AND METHOD FOR ROUTING TELEPHONE CALLS INVOLVING INTERNET PROTOCOL NETWORK

(75) Inventor: Mark Clinton Knox, Lafayette, CO (US)

(73) Assignee: Intrado Inc., Longmont, CO (US)

( * ) Notice: Subject to any disclaimer, the term of this patent is extended or adjusted under 35 U.S.C. 154(b) by 0 days.

(21) Appl. No.: 10/402,741

(22) Filed: Mar. 29, 2003

(65) Prior Publication Data

US 2004/0190497 A1  Sep. 30, 2004

(51) Int. Cl.[7] .......................................... H04L 12/66
(52) U.S. Cl. ..................................... 370/352; 370/401
(58) Field of Search ............................ 370/352, 355, 370/400, 401; 455/404.1, 404.2, 456.1, 456.2, 455/456.3, 456.5; 379/37, 45

(56) References Cited

U.S. PATENT DOCUMENTS

| | | | |
|---|---|---|---|
| 4,310,726 A | 1/1982 | Asmuth | |
| 6,067,356 A | 5/2000 | Lautenschlager et al. | |
| 6,128,481 A | 10/2000 | Houde et al. | |
| 6,678,357 B2 * | 1/2004 | Stumer et al. | 379/45 |
| 6,690,932 B1 * | 2/2004 | Barnier et al. | 455/414.1 |
| 2004/0057425 A1 * | 3/2004 | Brouwer et al. | 370/352 |

OTHER PUBLICATIONS

"NENA Technical Information Document on Network Interfaces for E9-1-1 and Emerging Technologies". National Emergency Number Association. Sep. 11, 2002. pp. 1 to 13-4.*

* cited by examiner

Primary Examiner—Ricky Ngo
Assistant Examiner—Derrick W Ferris

(57) ABSTRACT

A system for routing telephone calls from a calling party instrument to a called party instrument and involving at least one internet protocol network includes: (a) a first internet protocol interface apparatus effecting a first communicative coupling between the calling party instrument and the at least one internet protocol network; (b) a second internet protocol interface apparatus effecting routing telephone calls according to routing criteria to establish a second communicative coupling between the at least one internet protocol network and the called party instrument; and (c) a call routing system apparatus coupled with the second internet protocol interface apparatus and storing information relating to a geographical or geospatial relationship of calling party instruments and called party instruments. The second internet protocol interface apparatus and the call routing system apparatus cooperate to establish the routing criteria.

34 Claims, 3 Drawing Sheets

SYSTEM AND METHOD FOR ROUTING TELEPHONE CALLS INVOLVING INTERNET PROTOCOL NETWORK

BACKGROUND OF THE INVENTION

The present invention is directed to telecommunication systems, and especially to call routing in telecommunication systems involving at least one internet protocol (IP) network. The present invention is especially advantageous in routing of special number calls in telecommunication systems involving at least one IP network. Examples of such special number calls is E9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

In the past, routing of calls using an internet protocol network—commonly referred to as Voice over Internet Protocol (VoIP) calls—has typically been carried out according to long established Public Switched Telephone Network (PSTN) rules. Following those rules, a VoIP switch uses the destination phone number's (i.e., the called party) area code and prefix to determine the appropriate PSTN gateway to which the call should be handed off. The area code and prefix is sometimes referred to as the called party number's NPA/NXX. After the call is handed off to a PSTN, the PSTN then routes the call through the network by consulting switch-based routing tables using the destination phone number (i.e., the called party's number).

In some cases, the destination phone number is not sufficient to make proper routing decisions, and one must ascertain the caller's location to appropriately determine how to route a call. By way of example and not by way of limitation, in the case of calls placed in an E9-1-1 system seeking emergency services, the destination phone number ("9-1-1") does not uniquely map to a single public safety agency across the U.S. Instead, a 9-1-1 call maps to a specific Public Safety Answering Point (PSAP; sometimes also referred to as a Public Safety Answering Position) based on the caller's location. Such a caller location related routing in selecting a destination PSAP for a 9-1-1 call is not a problem if the caller is being served by a local switch where the mapping of "9-1-1" to the appropriate PSAP can be determined based on the originating phone number. For example, the NPA/NXX for the destination PSAP may be selected in such situations based upon the calling party's NPA/NXX.

A problem arises, however, in a VoIP network where a "centralized" switch can serve VoIP devices distributed over a broad geographic area and there is no fixed relationship between a caller's phone number (NPA/NXX) and the caller's location. As a result, communication networks operating using internet protocol (IP) cannot reliably route calls based upon the caller's location. Such IP network support for connecting geographically dispersed Voice over IP (VoIP) phone devices facilitates geographic portability of VoIP devices. For example, VoIP phones can be transported to any location, connected to the Internet, and calls may be completed from the new, often temporary, location. VoIP networks do not provide information regarding the geographic or geospatial location of callers. Location information is important, for example, when one needs to perform a service for a caller and may need to independently ascertain the caller's location without input from the caller. An example of such a situation is a special number call, such as a 9-1-1 emergency services call. Emergency service 9-1-1 calls will be employed herein as an exemplary embodiment of the present invention for purposes of illustration and explanation only and not for purposes of limiting the scope of the invention to special number calls only.

Voice over IP (VoIP) networks do not currently provide an accurate and reliable E9-1-1 solution. Using prior art technology, when a caller dials 9-1-1 on a VoIP network, the call is routed to the Public Switched Telephone Network (PSTN) by the VoIP switch using the calling party number of the user. The end office switch in the PSTN that locally serves the VoIP switch treats the call as an E9-1-1 call and passes it to a local E9-1-1 tandem (a specialized telecommunication switch for handling E9-1-1 call traffic). The E9-1-1 tandem queries its selective routing database (using the calling party number received) for the Public Safety Answering Point (PSAP) that has jurisdictional coverage for the caller. The E9-1-1 tandem then forwards the call to the identified PSAP over dedicated 9-1-1 trunks.

Such a straightforward prior art handling of calls suffices so long as the caller's location is within the same E9-1-1 tandem serving area as the VoIP switch. In VoIP networks, however, an IP phone in one part of the country (e.g. New York, N.Y.) can be served by a VoIP switch located in another part of the country (e.g. San Francisco, Calif.). Such operational portability creates problems vis-à-vis E9-1-1 call routing because, for example, the E9-1-1 tandem serving the VoIP switch in San Francisco will not recognize the caller's New York telephone number. That is, the E9-1-1 tandem serving the VoIP switch in San Francisco will not find the caller's New York telephone number in its selective routing tables, and thus will not be able to pass the call to the correct PSAP for providing emergency service for the caller in New York. Using prior art routing systems and techniques, the E9-1-1 tandem serving the VoIP switch in San Francisco will default route the call to a local PSAP in San Francisco. The San Francisco PSAP will be unable to dispatch appropriate emergency response to assist the caller in New York. The PSAP must verbally collect location information from the caller and try to determine the correct PSAP in New York appropriate for providing the needed emergency assistance. All the while, precious time is lost before an appropriate emergency response can be dispatched.

There is a need for a system and method for routing special number telephone calls involving an internet protocol network that facilitates routing of calls to a proper called party for providing appropriate response to the caller.

SUMMARY OF THE INVENTION

A system for routing telephone calls from a calling party instrument to a called party instrument and involving at least one internet protocol network includes: (a) a first internet protocol interface apparatus effecting a first communicative coupling between the calling party instrument and the at least one internet protocol network; (b) a second internet protocol interface apparatus effecting routing telephone calls according to routing criteria to establish a second communicative coupling between the at least one internet protocol network and the called party instrument; and (c) a call routing system apparatus coupled with at least the first internet protocol interface apparatus for affecting routing; said call routing system apparatus storing information relating to a geographical or geospatial relationship of calling party instruments and called party instruments. The second internet protocol interface apparatus and the call routing system apparatus cooperate to establish the routing criteria.

The term "geospatial" is used in the context of this disclosure to mean a three-dimensional characteristic that includes geographic determinations as well as altitude determinations. Geospatial analysis may include, by way of example and not by way of limitation, a determination of location of a site in a particular area of a particular floor of a particular building.

In the preferred embodiment of the system of the invention, the call routing system apparatus is coupled with the calling party instrument, preferably via an interim interface device. In the most preferred embodiment of the invention the call routing system apparatus is maintained at a location remote from the calling party by a third party as a service to which the calling party may subscribe, and coupling of the call routing system apparatus with the calling party instrument is effected via an interface coupling device or arrangement provided by the third party as part of a subscription service. Updating information may be provided to the call routing system apparatus via any one or more of several methods or mechanisms including, by way of example and not by way of limitation, the calling party instrument, web-site data provision, e-mail, voice phone call, facsimile, mail or other data providing mechanisms. Further in the preferred embodiment of the system of the invention, the information relating to a geographical or geospatial relationship of respective calling party instruments and respective called party instruments includes pseudo calling party communication codes uniquely identifying respective calling parties, pseudo called party communication codes uniquely identifying respective called parties and correlations among the pseudo calling party communication codes and the pseudo called party communication codes relating to a geographical or geospatial relationship of respective calling party instruments and respective called party instruments.

Preferably the first internet protocol interface apparatus includes a local internet protocol interface device coupled with the calling party instrument and the local internet protocol interface device with the at least one internet protocol network. Preferably the second internet protocol interface apparatus is coupled with the at least one internet protocol network and a public switched telephone network coupled with the called party instrument.

The system of the invention is preferably embodied in an emergency services call system in which the called party instrument is a communication device located in a public safety answering point.

A method for routing a telephone call from a calling party instrument to at least one selected called party instrument among a plurality of called party instruments and involving at least one internet protocol network includes the steps of: (a) in no particular order: (1) providing a first internet protocol interface apparatus effecting a first communicative coupling between the calling party instrument and the at least one internet protocol network; (2) providing a second internet protocol interface apparatus effecting routing the telephone call according to routing criteria to establish a second communicative coupling between the at least one internet protocol network and the selected called party instrument; and (3) providing a call routing system apparatus coupled with at least the second internet protocol interface apparatus; the call routing system apparatus containing stored information relating to a geographical or geospatial relationship of the calling party instrument and the plurality of called party instruments; and (b) operating the call routing system apparatus and at least the second internet protocol interface apparatus to cooperate in using the stored information to establish the routing criteria to effect call termination of the call by the second internet protocol interface apparatus to the at least one selected called party instrument from among the plurality of called party instruments meeting geographical or geospatial criteria.

A method for routing a special number telephone call from a calling party instrument to a selected called party instrument among a plurality of called party instruments and involving at least one internet protocol network includes the steps of: (a) in no particular order: (1) providing a first internet protocol interface apparatus effecting a first communicative coupling between the calling party instrument and the at least one internet protocol network; (2) providing a second internet protocol interface apparatus effecting a second communicative coupling between the at least one internet protocol network and a plurality of called party instruments; and (3) providing a call routing system apparatus coupled with the second internet protocol interface apparatus and with the second internet protocol interface apparatus; (b) operating the call routing system apparatus to store information relating to a geographical or geospatial relationship of the respective calling party instrument and at least one respective called party instrument of the plurality of called party instruments; (c) operating the second internet protocol interface apparatus to query the call routing system apparatus for the geographical or geospatial relationship of the calling party instrument to the at least one respective called party instrument; and (d) effecting call termination of the call by the second internet protocol interface apparatus to the selected called party instrument from among the at least one respective called party instrument meeting geographical or geospatial criteria.

It is, therefore, an object of the present invention to provide a system and method for routing special number telephone calls involving an internet protocol network that facilitates routing of calls to a proper called party for providing appropriate response to the caller.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
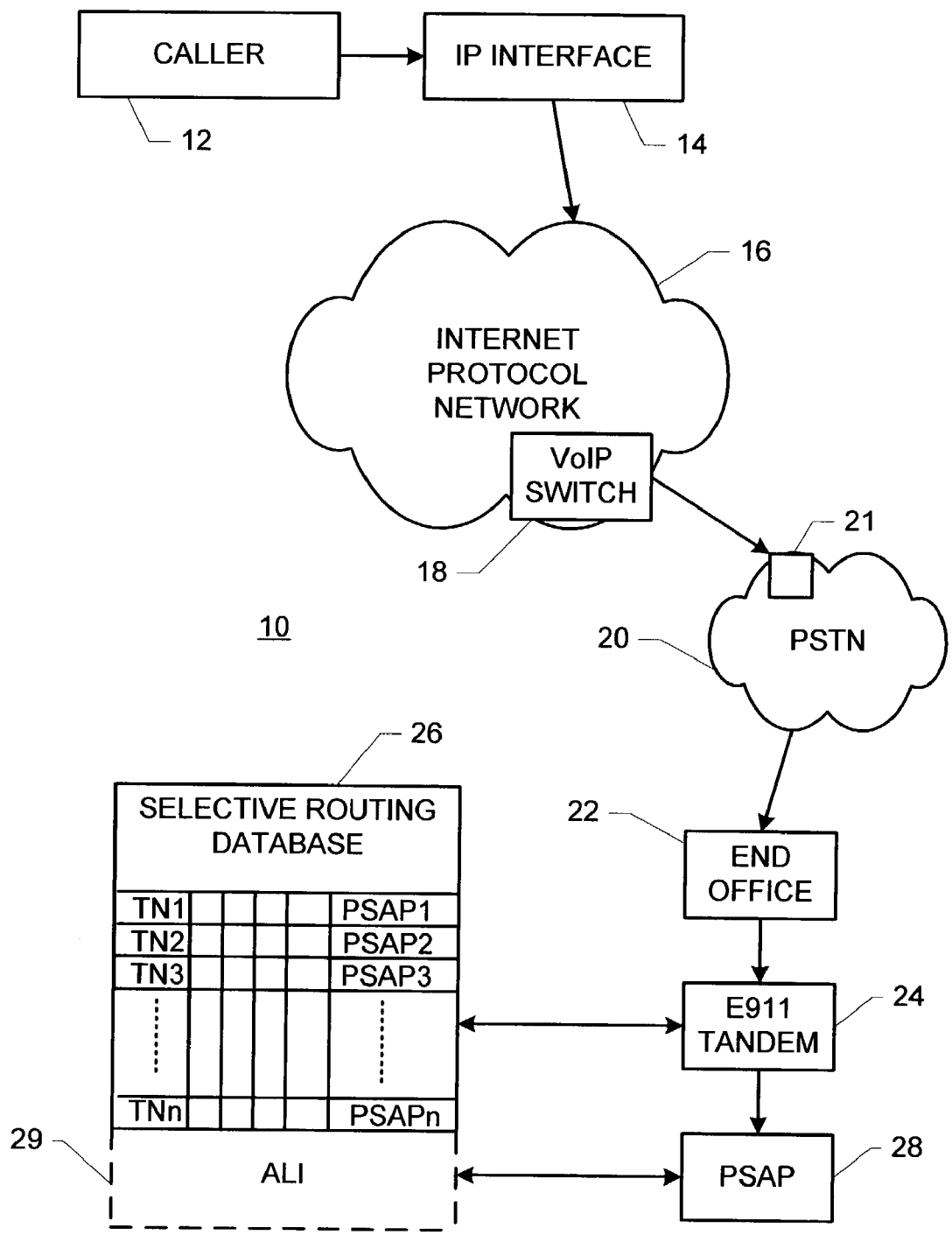
FIG. 1 is a schematic diagram illustrating routing an emergency service request call over an Internet Protocol network using a prior art system

The present invention is amenable to use for routing any type of telephone call involving at least one internet protocol (IP) network, including routing special number calls. By way of example and not by way of limitation, emergency service E9-1-1 calling will be employed in this description to illustrate the system and method of the invention.

Prior art, traditional wireline E9-1-1 calls are routed and delivered within a specific geographic area, such as a serving area for an E9-1-1 tandem. Routing is typically accomplished using static tables that correlate a street address to an Emergency Service Number (ESN), which translates to a specific Public Safety Answering Point (PSAP). Routing is sometimes effected by translating static street addresses into latitude and longitude coordinates that may be employed by Selective Routing Databases using spatial query algorithms to determine the corresponding ESN. Such alternative latitude-longitude based routing is still limited to the serving area of an E9-1-1 tandem. There is a need for a system and method that can route special number calls (e.g., emergency service E9-1-1 calls) over a wide geographic area (i.e. spanning multiple E9-1-1 tandems) and yet preserve 9-1-1 treatment for the call. That is, the call must be accompanied by indications relating to Automatic Number Identification (ANI) and Automatic Location Information (ALI). Further, the call must facilitate selective routing, selective transfer, and other special handling capabilities afforded to special number calls, such as E9-1-1 calls.

Some earlier—disclosed systems and methods provide an Emergency Service Call Center (ESCC) able to route a call to a correct PSAP and provide the PSAP with pertinent information (e.g. latitude and longitude, street address, vehicle collision data, etc.) related to the caller. This solution is satisfactory for calls originating anywhere in the ESCC service area as long as the ESCC receives the latitude and longitude of the caller. The latitude and longitude may be provided, for example, via a provisioned element (that is, information akin to routing information that accompanies the call as it traverses its call connections), or the latitude and longitude may provided by equipment at the caller's location, as in the case of a wireless phone having a location indicating capability such as a global positioning system (GPS) capability. Such an approach has been described in "Routing of Emergency Calls Based on Geographic Location of Originating Telephone End Office" by Patti L. McCalmont, Robert A. Sherry, Ronald W. Mathis, Peter R. Schmidt and Gerald Eisner; U.S. patent application Ser. No. 10/288,737, filed Nov. 5, 2002; which is a continuation-in-part of "Geographic Routing of Emergency Service Call Center Emergency Calls" by Patti L. McCalmont, Robert A. Sherry, Ronald W. Mathis and Peter R. Schmidt; U.S. patent application Ser. No. 10/277,438, filed Oct. 21, 2002, claiming benefit of U.S. Provisional Application Ser. No. 60/332,630, filed Nov. 5, 2001. Both of the cited utility patent applications are assigned to the assignee of the present application. The disclosures therein do not address how caller location may be generated for devices that lack location determination capabilities, nor is there disclosure as to how caller location can be used to generate call routing instructions applicable for an IP network. Neither of the above-cited disclosures provides sufficient flexibility to meet the needs of routing calls based upon caller location originating from an internet protocol (IP) network, especially special number calls, such as emergency service calls.

The present invention may be embodied in a system and method for use in a non-emergency services special number call system (e.g., an N-1-1 system). Examples of such N-1-1 systems include a 3-1-1 (urgent but not emergency calls) and 5-1-1 (traffic inquiry calls). In such systems, a called party instrument may be embodied in a communication device or in an automated system for service delivery.

The present invention may also include dynamic determination of information relating to a geographical or geospatial relationship of respective calling party instruments and respective called party instruments through geospatial analysis to accommodate changing criteria. The term "geospatial" is used in the context of this disclosure to mean a three-dimensional characteristic that includes geographic determinations as well as altitude determinations. Geospatial analysis may include, by way of example and not by way of limitation, a determination of location of a site in a particular area of a particular floor of a particular building.

The present invention may also include a provisioning apparatus for calling party data validation and determination of geographical or geospatial relationship of respective calling party instruments and respective called party instruments.

The present invention in its preferred embodiment can provide an emergency service provisioning system that includes aspects particularly useful to users of E9-1-1 services, such as Master Street Address Guide (MSAG) validation, Automatic Location Information (ALI) provisioning, Emergency Call Routing System provisioning, and Public Safety Answering Point (PSAP) determination through geocoding (i.e., geography-based coding) and geospatial queries against nationwide PSAP jurisdictional boundaries. The present invention further provides a special number call routing system, such as an emergency call routing system, that provides the caller location-to-PSAP and can provide PSAP-to-media gateway relationships. The present invention provides a newly defined interface between an internet protocol interface apparatus preferably embodied in a VoIP call manager apparatus and an emergency call routing system that can pass call related information to the emergency call routing system and allow the emergency call routing system to instruct the VoIP switch regarding how to route the call. The present invention also provides a new interface between the ALI system and the emergency call routing system that supports delivery of callback number, caller location and additional subscriber information from the emergency call routing system that may advantageously be combined with an MSAG valid address from the ALI system for delivery to the PSAP. The present invention permits the use of an IP network in conjunction with a PSTN to deliver an emergency service call that may be regarded as a native E9-1-1 call in that the call includes information expected to accompany an E9-1-1 call such as ALI, ANI, callback number, caller location and similar information and call treatment features such as selective routing and selective transfer.

The invention is described in an exemplary system and method for routing and delivery of an E 9-1-1 call originated from a VoIP network to the correct Public Safety Answering Point (PSAP) while providing the PSAP with pertinent information (e.g., call back number, caller location, and optionally, additional subscriber info) related to the caller. The emergency service call is routed to the PSAP as an E9-1-1 call, supporting Automatic Number Identification (ANI), Automatic Location Information (ALI), selective routing, selective transfer, congestion control, alternate & default routing, trunk failover, and other emergency service call characteristics. The invention also supports E9-1-1 call routing of emergency service calls from internet protocol (IP) phones whose telephone numbers do not conform to PSTN rate center boundaries (e.g., a New York phone number can be assigned to and used by an IP phone residing in Colorado).

Preferably, a VoIP subscriber's information is provided or updated in the emergency call routing system whenever the subscriber's location (i.e., call device location) or personal subscriber data changes. Examples of changes that should be updated for the emergency call routing system include new service activation, phone moves, directions to a caller's home, personal data changes including new allergies and medications and similar information. Phone moves preferably may be detected by the VoIP call manager apparatus in a manner to automatically trigger providing transactions to update the emergency call routing system. The subscriber's telephone number (TN), location, and personal data are preferably sent to an emergency provisioning system where information updates may be validated, including potential validation against the Master Street Address Guide (MSAG) database and/or geocoding (i.e., geography-based coding) of the location to an approximate latitude and longitude. The subscriber's location may be used to determine the serving PSAP by performing a geospatial query against PSAP jurisdictional boundaries or using some other non-spatial determination method, or this determination could be done by the emergency call routing system at the time of 9-1-1 call initiation to allow for dynamic PSAP coverage modifications. The TN, location, serving PSAP (optional), and subscriber information are preferably provided to the emergency call routing system for use during 9-1-1 call initiation. The TN and associated MSAG valid address could also be provided to the Automatic Location Information (ALI) system for subsequent display of the MSAG valid address to the PSAP during a 9-1-1 call.

When an IP protocol calling device initiates an E9-1-1 call, the VoIP call manager apparatus queries the emergency call routing system, passing the location and/or calling instrument identifier (for example, telephone number (TN)) of the caller. The emergency call routing system uses the calling instrument identifier to look up the stored location (if location is not provided by the call manager apparatus), callback telephone number (TN) of the calling device (if different from the calling instrument identifier), and subscriber information related to the calling party. The location may be used by the emergency call routing system to determine the serving PSAP by performing a geospatial query against PSAP jurisdictional boundaries or using some other non-spatial determination method. The serving PSAP identification is used to select an Emergency Services Routing Number (ESRN), an Emergency Services Query Key (ESQK), and a Media Gateway (MG) Address. The ESRN, ESQK(s) (there is preferably a pool of ESQKs for each PSAP to support multiple simultaneous calls) and MG Address are pre-provisioned in the emergency call routing system for each PSAP. The ESRN is a pseudo number used as a telephone number that designates the terminating Emergency Communications Network (ECN) switch for the serving PSAP, the ESQK is a pseudo number that may be used as a telephone number to route an emergency services call within the emergency services network to effect querying for pertinent caller information, and the MG Address is the IP address of a IP-to-PSTN gateway where the call will be handed off to the PSTN from the Internet Protocol (IP) network. It is preferable to use a media gateway local to the ECN switch coupled with the serving PSAP to eliminate PSTN toll charges. The emergency call routing system returns the ESRN, ESQK, and MG Address to the VoIP call manager apparatus, and the call manager apparatus cooperates with the local media gateway to route the call via the IP network to the PSTN using the ESQK as the Calling Party Number and the ESRN as the Called Party Number.

The PSTN routes the call to a terminating Emergency Communications Network (ECN) switch. The ECN switch may be a Class 5 switched provided by the Incumbent Local Exchange Carrier (ILEC), Competitive Local Exchange Carrier (CLEC), or a third party provider who owns the ECN switch. When the ECN switch receives the call, it uses the ESRN to determine the appropriate E9-1-1 tandem, deletes the ESRN and adds 9-1-1 as the Called Party Number, and forwards the call to the E9-1-1 tandem. The E9-1-1 tandem processes the call as a normal E9-1-1 call using the ESQK as the callers Automatic Number Identification (ANI). Alternatively, the E9-1-1 tandem can be configured to recognize the ESRN as relating to an E9-1-1 call and treat it accordingly.

When the PSAP receives the call, it queries the ALI system with the ESQK. The ALI system recognizes that the ESQK as being associated with the emergency call routing system and "steers" the query to the emergency call routing system for retrieving a callback number, the caller's location and additional subscriber information. The ALI system receives this information from the emergency call routing system and sends the complete caller information, including TN (callback number), location and other subscriber information to the PSAP for use at the PSAP to facilitate an appropriate emergency response. The ALI system may retrieve the MSAG validated address associated with the TN from its ALI database for provision to the PSAP.

FIG. 1 is a schematic diagram illustrating routing an emergency service request call over an Internet Protocol network using a prior art system. In FIG. 1, a communication system 10 includes a caller instrument 12 coupled with an internet protocol (IP) interface apparatus 14. IP interface apparatus 14 effects communicative coupling between caller instrument 12 and an Internet Protocol (IP) network 16. IP Network 16 may be the Internet, or it may be another network employing internet protocol communications. A Voice over IP (VoIP) switch 18 is associated with an IP network 16, for establishing communicative coupling between the IP network 16 and a Public Switched Telephone Network (PSTN) 20 via an IP-to-PSTN gateway 21. PSTN 20 communicatively couples extant calls traversing PSTN 20 with an end office (EO) 22 according to routing information that accompanies the extant call (not illustrated in detail in FIG. 1). When the extant call traversing PSTN 20 is an E9-1-1 call, for example, system 10 recognizes that characteristic of the extant call and end office 22 communicatively couples the extant call with an E911 tandem 24. E911 tandem 24 communicates with a selective routing database (SRDB) 26. Selective routing database 26 contains information relating selected telephone numbers (TNs) with respective Public Safety Answering Points (PSAPs). Upon ascertaining the particular PSAP 28 served by the telephone number of the extant E9-1-1 call traversing the PSTN, E911 tandem 24 couples the E9-1-1 call with PSAP 28, thereby completing the extant E9-1-1 call placed by caller instrument 12 with an appropriate PSAP 28 servicing the geographic area in which caller instrument 12 is situated. PSAP 28 may communicate with Automatic Location Information (ALI) facility 29 to obtain details relating to caller instrument 12. ALI facility 29 is sometimes closely allied with or even incorporated within selective routing database 26, as indicated by dotted lines in FIG. 1.

As mentioned earlier, such a straightforward handling of calls as described in connection with FIG. 1 suffices so long as caller instrument 12 is located within the same E9-1-1 tandem geographic serving area as VoIP switch 18. In VoIP networks such as the IP network 16, however, an IP caller instrument 12 in one part of the country (e.g. New York, N.Y.) can be served by a VoIP switch 18 located in another part of the country (e.g. San Francisco, Calif.). Such operational independence from callers' locations creates problems vis-à-vis some call routing, such as E9-1-1 call routing, because, for example, the E9-1-1 tandem 24 serving VoIP switch 18 in San Francisco will not recognize the New York telephone number of caller instrument 12. That is, the E9-1-1 tandem 24 serving the VoIP switch 18 in San Francisco will not find the New York telephone number of caller instrument 12 in selective routing database 26, and thus will not be able to pass the call to the correct PSAP 28 for providing emergency service for the caller in New York placing the extant E9-1-1 call from caller instrument 12. Using prior art routing system and techniques described in connection with FIG. 1, E9-1-1 tandem 24 serving VoIP switch 18 in San Francisco will default route the extant E9-1-1 call to a local PSAP in San Francisco (not shown in FIG. 1). The local PSAP in San Francisco will be unable to dispatch appropriate emergency response to assist the caller at caller instrument 12 in New York. The local PSAP in San Francisco must verbally collect location information from the caller using caller instrument 12 to determine the correct local PSAP in New York that is appropriate for providing the needed emergency assistance. All the while, precious time is lost before an appropriate emergency response can be dispatched for the caller using caller instrument 12 in New York.

Figure 2:
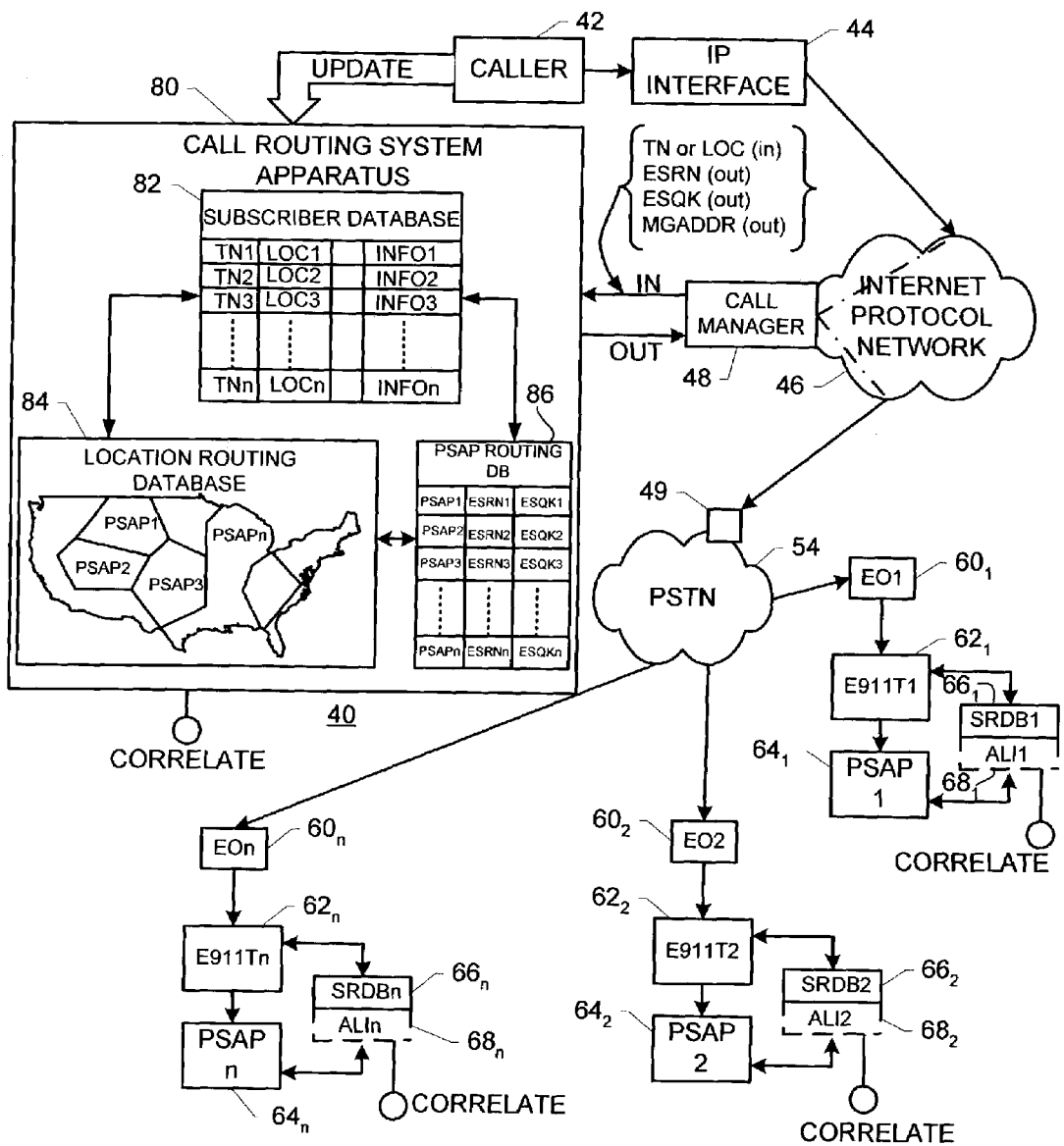
FIG. 2 is a schematic diagram illustrating routing of a call over an Internet Protocol network using the system of the present invention.

FIG. 2 is a schematic diagram illustrating routing of a call over an Internet Protocol network using the system of the present invention. In FIG. 2, a call is represented as an E9-1-1 call for purposes of describing the invention. The present invention may be embodied in a system and method for use in other special number call systems, such as a non-emergency services special number call system (e.g., an N-1-1 system). Examples of such N-1-1 systems include a 3-1-1 (urgent but not emergency calls) and 5-1-1 (traffic inquiry calls). Special number call systems may also include, by way of further example and not by way of limitation, abbreviated numbers for calling commercial services, such as "*820" (calling a radio station) or "GOTIX" (calling for tickets). In special number call systems, a called party instrument may be embodied in a communication device or in an automated system for service delivery.

A communication system 40 includes a caller instrument 42 coupled with a first internet protocol (IP) interface apparatus 44. First IP interface apparatus 44 effects communicative coupling between caller instrument 42 and an internet protocol (IP) network 46. IP Network 46 may be the Internet, or it may be another network employing internet protocol communications.

A second IP interface apparatus 48 establishes communicative coupling between the IP network 46 and a called party, such as an emergency service Public Safety Answering Point (PSAP). Second IP interface apparatus 48 operations include the role of a call manager apparatus coupled with a Public Switched Telephone Network (PSTN) 54 via IP network 46 and an IP-to-PSTN gateway apparatus 49. In an alternate configuration, second IP interface apparatus 48 may be coupled directly with PSTN 54 so that it may fulfill its role as a call manager apparatus coupling with PSTN 54 without traversing IP network 46 or IP-to-PSTN gateway apparatus 49. PSTN 54 is coupled with a plurality of end offices (EO) $60_1$ (EO1), $60_2$ (EO2), $60_n$ (EO3). Each end office $60_1$, $60_2$, $60_n$ is coupled with at least one E9-1-1 Tandem $62_1$ (E911T1), $62_2$ (E911T2), $62_n$ (E911Tn). Each E9-1-1 Tandem $62_1$, $62_2$, $62_n$ is coupled with at least one Public Safety Answering Point (PSAP, also known as a Public Safety Answering Position, sometimes referred to herein as a public safety answering facility) $64_1$ (PSAP1), $64_2$ (PSAP2), $64_n$ (PSAPn). Each E9-1-1 Tandem $62_1$, $62_2$, $62_n$, is coupled with a respective Selective Routing Database (SRDB) $66_1$ (SRDB1), $66_2$ (SRDB2), $66_n$ (SRDBn). Each PSAP $64_1$, $64_2$, $64_n$ is coupled with a respective Automatic Location Information (ALI) unit $68_1$ (ALI1), $68_2$ (ALI2), $68_n$ (ALIn).

Second IP interface apparatus 48 communicates with a Call Routing System Apparatus 80. Call Routing System Apparatus 80 includes a Subscriber Database 82 that provides correlations among subscriber-related information, such as telephone number (TN), location (LOC) and additional subscriber information (INFO). Additional subscriber information may include references to special needs of respective subscribers such as intolerance or allergy to certain medications, handicaps, or other details of interest to personnel that may respond to a special number call placed by a subscriber, such as emergency service personnel responding to an E9-1-1 call. Call Routing System Apparatus 80 also includes a Location Routing Database 84 that is communicatingly linked with Subscriber Database 82. Location Routing Database 84 provides correlations among locations (LOC) in Subscriber Database 82 and respective PSAP service areas.

Call Routing System Apparatus 80 also includes a PSAP Routing Database 86 that is communicatingly linked with Subscriber Database 82 and with Location Routing Database 84. PSAP Routing Database 86 provides correlations among respective PSAPs and associated pseudo-numbers useful in routing and call-back operations. Examples of such pseudo-numbers include an Emergency Services Routing Number (ESRN), an Emergency Services Query Key (ESQK), and a Media Gateway (MG) Address for association with the extant E9-1-1 call being placed. The ESRN, ESQK(s), and MG Address are pre-provisioned in Call Routing System Apparatus 80 for each PSAP $64_1$, $64_2$, $64_n$. The ESRN is a pseudo number used as a telephone number that designates an appropriate terminating Emergency Communications Network (ECN) switch (represented by end offices $60_1$, $60_2$, $60_n$; FIG. 2) in PSTN 54 for receiving the extant E9-1-1 call. The ESQK is a pseudo number that may be used to route the extant E9-1-1 call within communication system 40 and query for pertinent caller information (e.g., callback and location information).

Upon ascertaining which particular PSAP (e.g., PSAP1, $64_1$; FIG. 2) serves the caller location from which the extant E9-1-1 call traversing PSTN 54 originates (identified by the TN or LOC or other identifying information in Subscriber Database 82 relating to caller instrument 42), Call Routing System Apparatus 80 and second IP interface apparatus 48 cooperate to establish routing criteria for the extant E9-1-1 call to effect routing the extant call to PSAP1. The routing instructions effect routing the extant E9-1-1 call from IP network 46 via IP-to-PSTN gateway 49 and PSTN 54 to end office EO1, and thence via E9-1-1-Tandem E911T1 ($62_1$; FIG. 2) to PSAP1, thereby completing the extant E9-1-1 call placed by caller instrument 42 with an appropriate PSAP (i.e., PSAP1) servicing the geographic area in which caller instrument 42 is situated.

Call Routing System Apparatus 80 may be coupled with selected ALI units $68_1$, $68_2$, $68_n$, as indicated by coupling loci CORRELATE associated with each of Call Routing System Apparatus 80 and ALI units $68_1$, $68_2$, $68_n$. Alternatively, selected ALI units $68_1$, $68_2$, $68_n$ may be maintained as separate units from Call Routing System Apparatus 80.

Call Routing System Apparatus 80 and second IP interface apparatus 48 may alternatively also cooperate with first IP interface 44 to establish routing criteria for the extant E9-1-1 call to effect routing the extant call to an appropriate PSAP for providing emergency service for the location of caller instrument 42 (e.g., PSAP1 in exemplary communication system 40; FIG. 2).

The present invention may also include dynamic determination of information relating to a geographical or geospatial relationship of respective calling party instruments and respective called party instruments through geospatial analysis to accommodate changing criteria. The term "geospatial" is used in the context of this disclosure to mean a three-dimensional characteristic that includes geographic determinations as well as altitude determinations. Geospatial analysis may include, by way of example and not by way of limitation, a determination of location of a site in a particular area of a particular floor of a particular building.

The present invention may also include a provisioning apparatus for validation of data relating to a calling party and determination of geographical or geospatial relationship of respective calling party instruments and respective called party instruments.

Information relating to caller instrument 42 is updated in Subscriber Database 82 in Call Routing System Apparatus 80 to reflect any changes, such as moving caller instrument 42, medication changes for a user of caller instrument 42, or other information. Updates may be made by voice phone call using caller instrument 42 or another calling instrument, facsimile, email, web site data entry, U.S. Mail or any other communication medium that can convey the updated information to Call Routing System Apparatus 80. Updates may also be made via first IP interface 44 during phone calls.

Thus, when caller instrument 42 initiates a call, such as an E 9-1-1 call (by way of example and not by way of limitation), second IP interface apparatus 48 queries Subscriber Database 82 in Call Routing System Apparatus 80, passing the telephone number (TN) or other identifying information relating to caller instrument 42. If updated location information is provided via first IP interface apparatus 44 during the phone call there may be no need to query Subscriber Database 82 for the location. Call Routing System Apparatus 80 uses the location of calling instrument 42 in cooperation with Location Routing Database 84 to determine the serving PSAP for the geographic location related to calling instrument 42 (e.g., PSAP1 in exemplary communication system 40; FIG. 2). The identification of the appropriate serving PSAP (PSAP1) is used in cooperation with PSAP Routing Database 86 to select an Emergency Services Routing Number (ESRN), Emergency Services Query Key (ESQK), and Media Gateway (MG) Address for association with the extant E9-1-1 call being placed. As mentioned earlier herein, the ESRN, ESQK(s), and MG Address are pre-provisioned in Call Routing System Apparatus 80 for each PSAP $64_1$, $64_2$, $64_n$. The ESRN is a pseudo number used as a telephone number that designates an appropriate terminating Emergency Communications Network (ECN) switch (represented by end offices $60_1$, $60_2$, $60_n$; FIG. 2) in PSTN 54 for receiving the extant E9-1-1 call. The ESQK is a pseudo number that may be used to route the extant E9-1-1 call within communication system 40 and query for pertinent caller information (e.g., callback and location information). The ESQK may be used, for example, by a respective PSAP $64_1$, $64_2$, $64_n$ to query a respective ALI unit $68_1$, $68_2$, $68_n$ and used by a respective ALI unit $68_1$, $68_2$, $68_n$ to query Call Routing System Apparatus 80. The MG Address is the IP address of IP-to-PSTN gateway where the extant E9-1-1 call will be handed off to PSTN 54 (i.e., IP-to-PSTN gateway 49; FIG. 2).

Call Routing System Apparatus 80 returns the ESRN, ESQK, and MG Address to second IP interface apparatus 48. Call Routing System Apparatus 80 and second IP interface apparatus 48 cooperate to establish routing criteria for routing the extant E9-1-1 call to PSTN1 across IP network 46. One routing criteria may be for communication system 40 to use the ESQK as the Calling Party Number (representing caller instrument 42) and the ESRN as the Called Party Number (representing PSAP1).

PSTN 54 routes the extant E9-1-1 call to a terminating end office EO1. End office EO1 may, for example, use the ESRN to determine the appropriate E9-1-1 tandem E911T1, delete the ESRN and adds 9-1-1 as the Called Party Number, and, in this exemplary embodiment, forward the extant E9-1-1 call to E9-1-1 tandem E911T1. E911T1 processes the extant E9-1-1 call as a normal E9-1-1 call using the ESQK as the caller's Automatic Number Identification (ANI).

When PSAP1 receives the extant E9-1-1 call, PSAP1 queries ALI unit ALI1 using the ESQK. ALI unit ALI1 recognizes that the ESQK is associated with the emergency call routing system and "steers" the query to Call Routing System Apparatus 80 via the CORRELATE connection provided by communication system 40. Call Routing System Apparatus 80 may provide callback number, caller location and additional subscriber information relating the extant E9-1-1 caller with the ESQK. ALI unit ALI1 receives the information from Call Routing System Apparatus 80 and sends the complete caller information, including TN (callback telephone number), location and subscriber info to PSAP1, where the information may be used to facilitate an appropriate emergency response to the extant E9-1-1 call.

Figure 3:
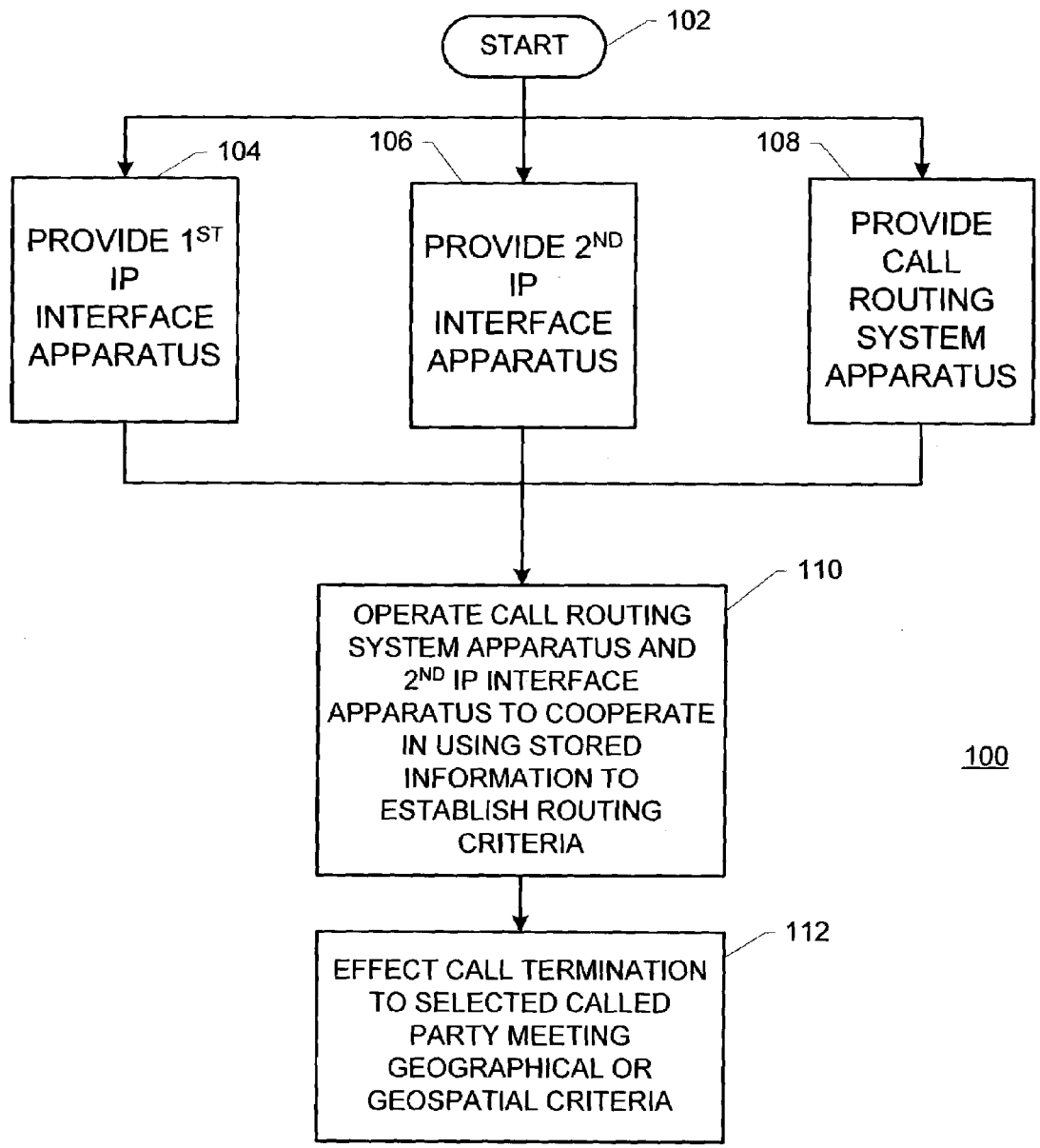
FIG. 3 is a flow diagram illustrating the method of the present invention.

FIG. 3 is a flow diagram illustrating the method of the present invention. In FIG. 3, a method 100 for routing a telephone call from a calling party instrument to at least one selected called party instrument among a plurality of called party instruments and involving at least one internet protocol network begins at a START locus 102. Method 100 continues with the steps of, (a) in no particular order: (1) Providing a first internet protocol interface apparatus, as indicated by a block 104. The first internet protocol apparatus effects a first communicative coupling between the calling party instrument and the at least one internet protocol network. (2) Providing a second internet protocol interface apparatus, as indicated by a block 106. The second internet protocol interface apparatus effects routing the telephone call according to routing criteria to establish a second communicative coupling between the at least one internet protocol network and the selected called party instrument. (3) Providing a call routing system apparatus, as indicated by a block 108. The call routing system apparatus is coupled with the second internet protocol interface apparatus and contains stored information relating to a geographical or geospatial relationship of the calling party instrument and the plurality of called party instruments. (b) Operating the call routing system apparatus and the second internet protocol interface apparatus to cooperate, as indicated by a block 110, in using the stored information to establish the routing criteria to effect call termination of the call by the second internet protocol interface apparatus to the at least one selected called party instrument from among the plurality of called party instruments meeting geographical or geospatial criteria, as indicated by a block 112.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A system for routing a telephone call from a calling party instrument in an internet protocol network to a called party instrument in a second network, the system comprising:
   (a) a first internet protocol interface apparatus effecting a first communicative coupling between said calling party instrument and said internet protocol network;
   (b) a gateway which can effect a second communicative coupling between said internet protocol network and said second network;
   (c) a second internet protocol interface apparatus effecting routing said telephone call according to routing criteria to establish a third communicative coupling between said internet protocol network and said called party instrument; and
   (d) a call routing system apparatus coupled with said second internet protocol interface apparatus, said second internet protocol apparatus and said call routing system apparatus cooperating:
      (i) to associate said calling party instrument with a geographic location,
      (ii) to select for said called party instrument an instrument that is communicatively coupled with said second network and meets geographical or geospatial criteria relative to said geographic location, and
      (iii) to establish as said routing criteria, criteria to route said call via said internet protocol network, said gateway, and said second network.

2. A system for routing telephone calls from a calling party instrument to a called party instrument and involving at least one internet protocol network; the system comprising:
   (a) a first internet protocol interface apparatus effecting a first communicative coupling between said calling party instrument and said at least one internet protocol network;
   (b) a second internet protocol interface apparatus effecting routing said telephone calls according to routing criteria to establish a second communicative coupling between said at least one internet protocol network and said called party instrument; and
   (c) a call routing system apparatus coupled with said second internet protocol interface apparatus and coupled with said calling party instrument; said call routing system apparatus storing information relating to a geographical or geospatial relationship of respective said calling party instruments and respective said called party instruments; said second internet protocol apparatus and said call routing system apparatus cooperating to establish said routing criteria; said calling party instrument providing updating information to said call routing system apparatus.

3. A system for routing a telephone call from a calling party instrument to a called party instrument as recited in claim 1 wherein said routing criteria includes an ESRN.

4. A system for routing a telephone call from a calling party instrument to a called party instrument as recited in claim 3 wherein said call routing system apparatus is further coupled with said calling party instrument; said calling party instrument providing updating information to said call routing system apparatus.

5. A system for routing a telephone call from a calling party instrument to a called party instrument as recited in claim 1 wherein said second network is a public switched telephone network.

6. A system for routing a telephone call from a calling party instrument to a called party instrument as recited in claim 4 wherein said second network is a public switched telephone network.

7. A system for routing a telephone call from a calling party instrument to a called party instrument as recited in claim 1 wherein the system is an emergency services call system and wherein said called party instrument is a communication device located in a public safety answering facility.

8. A system for routing a telephone call from a calling party instrument to a called party instrument as recited in claim 3 wherein the system is an emergency services call system and wherein said called party instrument is a communication device located in a public safety answering facility.

9. A system for routing a telephone call from a calling party instrument to a called party instrument as recited in claim 6 wherein the system is an emergency services call system and wherein said called party instrument is a communication device located in a public safety answering facility.

10. A method for routing a telephone call from a calling party instrument in an internet protocol network to a called party instrument selected from among a plurality of instruments in a second network, the method comprising the steps of:
    (a) in no particular order:
       (1) providing a first internet protocol interface apparatus effecting a first communicative coupling between said calling party instrument and said internet protocol network;
       (2) providing a gateway which can effect a second communicative coupling between said internet protocol network and said second network;
       (3) providing a second internet protocol interface apparatus effecting routing said telephone call according to routing criteria to establish a third communicative coupling between said internet protocol network and said called party instrument; and
       (4) providing a call routing system apparatus coupled with said second internet protocol interface apparatus; and
    (b) operating said call routing system apparatus and said second internet protocol interface apparatus to cooperate in:
       (1) associating said calling party instrument with a geographic location,
       (2) from among said plurality of instruments, selecting for said called party instrument an instrument that:
          (i) is communicatively coupled with said second network, and
          (ii) meets geographical or geospatial criteria relative to said geographic location, and
       (3) establishing as said routing criteria, criteria to route said call via said internet protocol network, said gateway, and said second network, and
       (4) using said routing criteria to effect call termination of said call to said called party instrument.

11. A method for routing a telephone call from a calling party instrument to at least one selected called party instrument among a plurality of called party instruments and involving at least one internet protocol network; the method comprising the steps of:
(a) in no particular order:
(1) providing a first internet protocol interface apparatus effecting a first communicative coupling between said calling party instrument and said at least one internet protocol network;
(2) providing a second internet protocol interface apparatus effecting routing said telephone call according to routing criteria to establish a second communicative coupling between said at least one internet protocol network and said selected called party instrument; and
(3) providing a call routing system apparatus coupled with said second internet protocol interface apparatus and coupled with said calling party instrument; said call routing system apparatus containing stored information relating to a geographical or geospatial relationship of said calling party instrument and said plurality of called party instruments; said calling party instrument providing updating information to said call routing system apparatus; and
(b) operating said call routing system apparatus and said second internet protocol interface apparatus to cooperate in using said stored information to establish said routing criteria to effect call termination of said call by said second internet protocol interface apparatus to said at least one selected called party instrument from among said plurality of called party instruments meeting geographical or geospatial criteria.

12. A method for routing a telephone call from a calling party instrument to a called party instrument as recited in claim 10 wherein said routing criteria includes an ESRN.

13. A method for routing a telephone call from a calling party instrument to a called party instrument as recited in claim 10 wherein said second network is a public switched telephone network.

14. A method for routing a telephone call from a calling party instrument to a called party instrument as recited in claim 10 wherein the method is used in an emergency services call system and wherein said called party instrument is a communication device located in a public safety answering facility.

15. A system for routing a telephone call from a calling party instrument to a called party instrument as recited in claim 1, 2, 3 or 5 wherein the system is a non-emergency special number call system and wherein said called part instrument is a communication apparatus for service delivery.

16. A method for routing a telephone call from a calling party instrument to a called party instrument as recited in claim 10 wherein the method is used in a non-emergency special number call system and wherein said called part instrument is a communication apparatus for service delivery.

17. A system for routing a telephone call from a calling party instrument to a called party instrument as recited in claim 1, 2, 3 or 5 wherein whether said geographical or geospatial criteria relative to said geographic location is met is dynamically determined through geospatial analysis.

18. A method for routing a telephone call from a calling party instrument to a called party instrument as recited in claim 10 wherein whether said geographical or geospatial criteria relative to said geographic location is met is dynamically determined through geospatial analysis.

19. A system for routing a telephone call from a calling party instrument to a called party instrument as recited in claim 1,2, 3 or 5 wherein the system includes a provisioning apparatus for calling party data validation.

20. A method for routing a telephone call from a calling party instrument to a called party instrument as recited in claim 10 further comprising as substep (5) of step (a), providing a data provisioning apparatus for calling party data validation.

21. A method for routing a telephone call from a calling party instrument in an internet protocol network to a called party instrument selected from among a plurality of instruments and involving a first internet protocol interface apparatus effecting a first communicative coupling between said calling party instrument and said internet protocol network; a gateway which can effect a second communicative coupling between said internet protocol network and said second network; a second internet protocol interface apparatus effecting routing said telephone call according to routing criteria to establish a third communicative coupling between said internet protocol network and said called party instrument; the method comprising the steps of:
(a) providing a call routing system apparatus coupled with said second internet protocol interface apparatus; and
(b) operating said call routing system apparatus and said second internet protocol interface apparatus to cooperate in:
(1) associating said calling party instrument with a geographic location,
(2) from among said plurality of instruments, selecting for said called party instrument an instrument that is:
(i) communicatively coupled with said second network and
(ii) meets geographical or geospatial criteria relative to said geographic location, and
(3) establishing as said routing criteria, criteria to route said call via said internet protocol network, said gateway, and said second network to effect call termination of said call to said called party instrument.

22. A method for routing a telephone call from a calling party instrument to at least one selected called party instrument among a plurality of called party instruments and involving at least one internet protocol network; a first internet protocol interface apparatus effecting a first communicative coupling between said calling party instrument and said at least one internet protocol network; a second internet protocol interface apparatus effecting routing said telephone call according to routing criteria to establish a second communicative coupling between said at least one internet protocol network and said selected called party instrument; the method comprising the steps of:
(a) providing a call routing system apparatus coupled with said second internet protocol interface apparatus and coupled with said calling party instrument; said call routing system apparatus containing stored information relating to a geographical or geospatial relationship of said calling party instrument and said plurality of called party instruments; said calling party instrument providing updating information to said call routing system apparatus; and
(b) operating said call routing system apparatus and said second internet protocol interface apparatus to cooperate m using said stored information to establish said routing criteria to effect call termination of said call by said second internet protocol interface apparatus to said at least one selected called party instrument from among said plurality of called party instruments meeting geographical or geospatial criteria.

23. A method for routing a telephone call from a calling party instrument in an internet protocol network to a called party instrument selected from among a plurality of instruments in a second network, as recited in claim 21 wherein said routing criteria includes an ESRN.

24. A method for routing a telephone call from a calling party instrument to a called party instrument as recited in claim 21 wherein said second network is a public switched telephone network.

25. A method for routing a telephone call from a calling party instrument to a called party instrument as recited in claim 21 wherein the method is used in an emergency services call system and wherein said called party instrument is a communication device located in a public safety answering facility.

26. A system for routing a telephone call from a calling party instrument in an internet protocol network to a called party instrument in a second network, and involving a first internet protocol interface apparatus effecting a first communicative coupling between said calling party instrument and said internet protocol network; a gateway which can effect a second communicative coupling between said internet protocol network and said second network; a second internet protocol interface apparatus effecting routing said telephone call according to routing criteria to establish a third communicative coupling between said internet protocol network and said called party instrument; the system comprising:
  a call routing system apparatus coupled with said second internet protocol interface apparatus, said second internet protocol apparatus and said call routing system apparatus cooperating:
    (i) to associate said calling party instrument with a geographic location,
    (ii) to select for said called party instrument an instrument that is communicatively coupled with said second network and meets geographical or geospatial criteria relative to said geographic location, and
    (iii) to establish as said routing criteria, criteria to route said call via said internet protocol network, said gateway, and said second network.

27. A system for routing telephone calls from a calling party instrument to a called party instrument and involving at least one internet protocol network; a first internet protocol interface apparatus effecting a first communicative coupling between said calling party instrument and said at least one internet protocol network; a second internet protocol interface apparatus effecting routing said telephone calls according to routing criteria to establish a second communicative coupling between said at least one internet protocol network and said called party instrument; the system comprising:
  a call routing system apparatus coupled with said second internet protocol interface apparatus and coupled with said calling party instrument; said call routing system apparatus storing information relating to a geographical or geospatial relationship of respective said calling party instruments and respective said called party instruments; said second internet protocol apparatus and said call routing system apparatus cooperating to establish said routing criteria; said calling party instrument providing updating information to said call routing system apparatus.

28. A system for routing a telephone call from a calling party instrument in an internet protocol network to a called party instrument in a second network, as recited in claim 26 wherein said routing criteria includes an ESRN.

29. A system for routing telephone calls from a calling party instrument to a called party instrument and involving at least one internet protocol network; a first internet protocol interface apparatus effecting a first communicative coupling between said calling party instrument and said at least one internet protocol network; a second internet protocol interface apparatus effecting routing said telephone calls according to routing criteria to establish a second communicative coupling between said at least one internet protocol network and said called party instrument; the system comprising: a call routing system apparatus coupled with said second internet protocol interface apparatus and coupled with said calling party instrument; said call routing system apparatus storing information relating to a geographical or geospatial relationship of respective said calling party instruments and respective said called party instruments; said second internet protocol apparatus and said call routing system apparatus cooperating to establish said routing criteria; said calling party instrument providing updating information to said call routing system apparatus; said information relating to a geographical or geospatial relationship of respective said calling party instruments and respective said called party instruments includes pseudo calling party communication codes uniquely identifying respective said calling parties, pseudo called party communication codes uniquely identifying respective said called parties and correlations among said pseudo calling party communication codes and said pseudo called party communication codes relating to said geographical or geospatial relationship of respective said calling party instruments and respective said called party instruments.

30. A system for routing a telephone call from a calling party instrument in an internet protocol network to a called party instrument in a second network as recited in claim 26 wherein said network is a public switched telephone network.

31. A system for routing telephone calls from a calling party instrument to a called party instrument and involving at least one internet protocol network as recited in claim 29 wherein said second internet protocol interface apparatus effects said routing via a public switched telephone network.

32. A system for routing a telephone call from a calling party instrument in an internet protocol network to a called party instrument in a second network as recited in claim 26 wherein the system is an emergency services call system and wherein said called party instrument is a communication device located in a public safety answering facility.

33. A system for routing a telephone call telephone calls from a calling party instrument in an internet protocol network to a called party instrument in a second network as recited in claim 28 wherein the system is an emergency services call system and wherein said called party instrument is a communication device located in a public safety answering facility.

34. A system for routing telephone calls from a calling party instrument to a called party instrument and involving at least one internet protocol network as recited in claim 31 wherein the system is an emergency services call system and wherein said called party instrument is a communication device located in a public safety answering facility.

* * * * *